United States Patent Office 3,846,143
Patented Nov. 5, 1974

3,846,143
SOURCE COMPOSITION FOR ALKALI METAL OXIDES AND ALUMINUM OXIDE
William A. Mod and Donald L. Caldwell, Lake Jackson, Tex., assignors to The Dow Chemical Company, Midland, Mich.
No Drawing. Continuation-in-part of abandoned application Ser. No. 724,621, Apr. 26, 1968. This application Mar. 25, 1971, Ser. No. 128,126
Int. Cl. C03b 1/00; C03c 3/04
U.S. Cl. 106—52
7 Claims

ABSTRACT OF THE DISCLOSURE

A method of making glass using a glass batch containing a reaction product of an aluminum oxide source material with an alkali metal hydroxide as a source of aluminum oxide and alkali metal oxide in the batch. Use of such reaction product produces a glass with low seed content without the need for adding sodium sulfate to the batch as a fining agent.

This application is a continuation in part of Ser. No. 724,621, filed Apr. 26, 1968, now abandoned.

BACKGROUND OF THE INVENTION

Conventionally soda-lime and boro-silicate glasses are prepared by melting a glass batch in a furnace to produce molten glass which is then solidified and formed into useful shapes. The glass batch ordinarily contains sand, a boric oxide source (for boro-silicate glass), an alkali metal oxide source (e.g. $Na_2CO_3$), an alkaline earth metal oxide source (e.g. $CaCO_3$), and various other oxide sources including aluminum oxide. The batch ingredients are mixed dry or wet (with water or NaOH and water) and fed into the furnace.

Various batch components can be premixed and then admixed with the batch. For example, Slayter (U.S. 3,001,881) discloses adding a portion of the sand to the rest of the batch ingredients in combined form, e.g. as a reaction product with another ingredient such as NaOH, or as a mineral form such as a naturally occurring silicate. Pugh (U.S. 3,489,578) premixes NaOH with CaO and adds this product to the sand. Mod et al. (U.S. 3,630,673) relates to a glass prebatch alkali metal oxide and alkaline earth metal oxide source material.

In melting glass batches sodium sulfate ($Na_2SO_4$) or similar fining agent is normally added to the batch to fine the molten glass, i.e. remove undissolved gases from the molten glass. Trapped bubbles of undissolved gas are referred to as seeds. For a conventional glass batch, seeds in the glass produced are reduced by the use of sodium sulfate. However, the sodium sulfate addition does lead to an air pollution problem since $SO_2$ gas is released. Thus it would be desirable to find a method of making glass and the batch which does not require the use of a sodium sulfate fining agent.

A primary object of the invention is to provide a method of preparing a glass batch composition.

Another object of the present invention is to provide a method of preparing a glass batch composition to produce a low seed-containing glass even without the addition of sodium sulfate.

A further object of the invention is to provide a novel method of preparing glass.

The above and other objects and advantages will be more fully understood in view of the following description of the present invention.

THE INVENTION

The present invention is based on the discovery that when the reaction product of an aluminum oxide source and an alkali metal hydroxide is used in the glass batch as the source of $Al_2O_3$ and alkali metal oxide in the glass, the glass so produced has a low seed count even without the addition of sodium sulfate fining agent.

Preparation of the aluminum oxide source-alkali metal hydroxide reaction product in accordance with the present invention comprises reacting an alkali metal hydroxide (anhydrous or aqueous) with an aluminum oxide source material at a temperature at which the alkali metal hydroxide is liquid for a period of time sufficient to convert by reaction essentially all of the aluminum oxide source reactant to form a reaction product containing a complex of alkali metal aluminates. The reaction product while still wet or moist can be utilized as is, granulated and dried, dried to a powder, or spray dried.

The alkali metal hydroxides which may be used in the aforesaid preparation of the reaction product include, sodium hydroxide, potassium hydroxide and other alkali metal hydroxides such as, for example, lithium hydroxide, depending on the composition of the glass desired and the relative economics involved. Sodium hydroxide as a 45 to 80% aqueous solution is preferred. In general, the amount of the particular alkali metal hydroxide reactant to be employed may vary as to its concentration in an aqueous solution for use in producing compositions and depends on the amount necessary to obtain conversion of the aluminum oxide as aforesaid. In addition, when making glass, the amount of alkali metal hydroxide will depend on the final amount of alkali metal flux for oxides, such as, for example, sodium oxide, desired in the final glass composition. As a minimum of alkali metal hydroxide, there should at least be 3 mols of the alkali metal hydroxide reactant to 1 mol of the aluminum oxide source reactant material. Further, the alkali metal hydroxide, preferably sodium hydroxide, should be present in the complex compound and/or as free sodium hydroxide in the reaction product in an amount to provide at least 50%, and preferably all, of the necessary alkali metal flux oxides in a final glass product. Normally, the concentration of alkali metal flux oxide and aluminum oxide in a final glass product should be in a weight proportion range of from about 2:1 to about 36:1.

The term "glass" as herein used refers to glass product compositions ordinarily used, for example, for windows and bottles having a silica sand content generally between about 60 and 85%, preferably between 68 and 75%; and alkali flux values ($Na_2O$ and $K_2O$) between 4 and 20%, including the so-called "soda-lime glasses" having between 10 and 20% alkali fluxes as well as the chemical and heat resistant boro-silicate glasses ranging in silica plus boric oxide from about 85 to 93% and an alkali flux content from about 4 to about 10%; aluminum oxide, lead oxide and the common stabilizing and modifying oxides of magnesia and calcia essentially making up the remaining constituents.

The most common sources of alumina (aluminum oxide) for glass making are feldspar (orthoclase $-K_2O \cdot Al_2O_3 \cdot 6SiO_2$ or albite $Na_2O \cdot Al_2O_3 \cdot 6SiO_2$), aplite, and nepheline syenite. Aplite and nepheline syenite are mixtures of feldspar and nephelite [(Na, K) $AlSO_4$]. The aluminum oxide-alkali metal oxide source composition of the present invention used in a glass batch is not dependent on a high quality alumina source and therefore permits utilization of less expensive alumina sources, such as, bauxite (aggregate of several aluminum compounds). Kyanite ($Al_2O_3 \cdot SiO_2$) may also be used as an alumina source.

The reactants employed to make the composition described hereinbefore should generally be within a mesh size range (U.S. Standard Sieve Series) corresponding approximately to the particle size distribution, or average particle size, of the glass grade sand used in a glass-making batch when the composition is going to be employed for glass making purposes.

The operable temperature range for the reaction is between the melting point and the boiling point of the particular alkali metal hydroxide used.

For the preferred aqueous NaOH solution of 45–80% concentration, an operable temperature within the range, for example, of from about 60° C. to about 215° C. is normally employed in preparing the composition of the invention for up to about 120 minutes and preferably a temperature of from about 130° C. to about 190° C. for from about 3 to about 60 minutes, usually from about 10 to about 60 minutes. While temperatures deviating from the operable range may be employed, there is no advantage in doing so since at temperatures below about 60° C., excessive reaction times are required. At higher temperatures than 215° C. the reaction mass may readily reach the boiling point, thus, should be avoided. In addition, at low alkali metal hydroxide concentrations, for example, below about 45% aqueous sodium hydroxide, excessive amounts of heat are required for reaction, while at higher alkali metal hydroxide concentrations, for example, higher than 80% aqueous NaOH, higher melting points result.

The composition prepared as described by the aforesaid reaction steps and conditions typically contains alkali metal aluminate, alkali metal hydroxide, and other compound complexes. While precise quantitative analysis of the reaction product is difficult, tests do show a considerable amount of said alkali metal aluminate to be consistently present.

The composition so prepared in accordance with the foregoing is highly useful and advantageous as a raw material in the glass industry as a component in a glass making batch to furnish alkali metal flux oxide values and aluminum oxide values such as, for example, $Na_2O$ and $Al_2O_3$, respectively. With respect to such use in the glass making industry, the composition prepared in accordance with the present invention is normally substituted for the individual conventional feldspar and sodium hydroxide or soda ash components in a glass making batch. In other words, the composition is prepared in accordance herewith, dried, then ground to a particle size generally consistent with that of the silica sand components, e.g., 20 to 100 mesh or finer, whereupon, the composition so ground is admixed with said glass formers together with the alkaline earth metal oxide source material and other modifying oxides normally employed in glass making batches. The batch is then wetted with from 5 to 10% water or a dilute alkali metal hydroxide solution and is introduced into a glass melting furnace. The batch employing the composition of the present invention should preferably be mixed in a moist state for a sufficient time to obtain at least reasonable homogeneity and preferably to obtain an aqueous coating of the composition over the particle surface of as much of the sand component as possible.

As previously noted, the method of making glass in accordance with the present invention has the advantage, among others, of either eliminating or greatly reducing the need to use separate fining agents such as for example, sodium sulfate, during fining of glass making batches as is normally required with conventional feldspar containing glass batches. These fining agents are expensive and tend to escape from the glass melt, plugging and corroding the regenerative checkers and leaving the stack as an undesirable visible plume. The conventional glass batches employing separate alkali metal oxide source and alumina source materials require the fining agents to increase the fining rate, i.e., the rate at which gas bubbles or seeds leave the melt. Using the source composition in the method of glass making of the present invention produces a vastly improved fining rate without separate fining agents. In fact use of a fining agent with the composition of the present invention may be detrimental, i.e., the fining rate is lower with the fining agent than without the fining agent.

Furthermore, the present invention in a method of making glass has the additional advantage of reducing the handling of the sand component in glass batches. This is accomplished inasmuch as the composition may be readily prepared, either at the glass making plant site or at the site of, e.g., a supply of sodium hydroxide and alumina. That is, the sand component of glass making batches need not enter into the actual final glass batch composition until just prior to introducing the batch into the melting furnace.

As a further embodiment of the method of glass making within the present invention, the composition as heretofore defined can be reacted with an alkaline earth metal oxide source to provide a complex which is a source of the alkali metal oxides, alkaline earth metal oxides and aluminum oxide values in a glass batch. This complex "pre-batch," to be added to the glass formers prior to melting, is prepared by admixing a sufficient amount of the alkali metal oxide and aluminum oxide source composition to provide at least 50 percent of the alkali metal oxide value and all of the aluminum oxide value desired in the final glass product with a sufficient amount of alkaline earth metal oxide source material to provide all of the alkaline earth metal oxide value in the final glass product and reacting said mixture at a temperature within the range of from about 60° C. to about 215° C. for a time sufficient to convert a substantial amount of the alkaline earth metal oxide source to the corresponding hydroxide in a complex consisting of alkaline earth metal hydroxide-alkali metal hydroxide complex, unreacted alkaline earth metal oxide source, unreacted aluminum oxide source material, and a considerable amount of other amorphous material. Preferably the composition of the present invention and the alkaline earth metal oxide source material are reacted at a temperature within the range of about 100° C. to about 200° C. for from about 3 to 60 minutes. The preferred alkaline earth metal oxide source material is calcium carbonate. The resulting combined alkaline earth metal oxide, alkali metal oxide and aluminum oxide source is admixed with glass formers in a manner similar to the mixing of the alkali metal oxide-alumina composition of the present invention with glass formers and other conventional glass batch constituents.

The term "alkaline earth metal oxide source" as used herein refers to calcium carbonate, dolomite, calcined dolomite, calcium hydroxide and calcium oxide.

The use of this combined alkaline earth metal oxide, alkali metal oxide and alumina source in glass making method of the present invention eliminates or greatly reduces decrepitation, i.e., the exploding or bursting of the alkaline earth metal oxide source, e.g., $CaCO_3$ during melting of conventional glass batches which cause dusting and furnace maintenance problems. Since the alkaline earth metal oxide source has been substantially reacted to the corresponding hydroxide prior to mixing with the glass formers, the degassing and decrepitation problems are vastly reduced.

The following example serves to further illustrate and provide particular and preferred embodiments, but it should be understood that these examples are not intended to limit the invention in any way.

Example I 367.03 Grams of 73.0% caustic solution was heated to 110° C. in a one-gallon Hobart laboratory mixer. 135.00 Grams of feldspar which had previously been sized to pass through a 100 mesh screen, U.S.S., was added and heat was applied to the batch while mixing. After 43 minutes, a temperature of 220° C. had been reached and the mixtures had thickened, forming soft lumps of solid material. These lumps were dried to constant weight in a 300° C. oven, cooled, and ground with a mortar and pestle to pass through a 50 mesh screen, U.S. Standard Sieve Series (U.S.S.). The material was then evaluated in glass melts.

For the purpose of Examples I and II and the comparative example, a standard "seed count test" is employed. In general, this test comprises, first providing an amount of the glass-forming composition to be tested sufficient to provide, when melted, 50.0 grams of glass. The composition is then placed in an Englehard Standard Form No. 201 (250 cc.) platinum-rhodium crucible and exposed to a temperature of about 1450° C. for a measured period of time sufficient to produce a stone-free melt, i.e. one free of unmelted, non-transparent, solid inclusions; whereupon, the viscous molten glass mass is solidified into an essentially stone-free patty about 47 mm. in diameter and about 11 mm. in thickness. The patty is released from the crucible, annealed, weighed, and immersed in a dish filled with an indexing liquid of, for example, benzyl alcohol. The dish is placed in a vacuum jar and evacuated until all blemishes on the surfaces of the patty are seen to be filled with liquid. So treated, the patty is placed in a dish filled with the same indexing liquid, a strong light is shone through the side of the patty, a photographic transparency is made and projected onto a screen and the seeds (bubbles or gaseous inclusions) in the magnified projection are counted.

The glass-forming compositions of Examples I and II and the comparative example were calculated to give a resultant glass of the same approximate oxide composition, as follows:

| | Percent |
|---|---|
| $SiO_2$ | 74.1 |
| $Na_2O+K_2O$ | 14.7 |
| $CaO+MgO$ | 9.4 |
| $Al_2O_3$ | 1.8 |
| | 100.0 |

The batches of Examples I and II and the comparative example were essentially the same as to particle size range of the various individual raw materials and corresponding reaction products, i.e. sand size range was the same throughout and the reaction products size ranges were equivalent to the size ranges of the individual components.

With glass-forming compositions containing sodium sulfate additions most of the sulfate is volatilized in the melting furnace, and therefore the resultant oxide composition of the resulting glass does not differ appreciably from that given above.

Weight of raw materials used to form one glass patty were as follows:

| | Grams |
|---|---|
| Sand | 34.02 |
| Limestone | 8.32 |
| Reaction Product | 12.00 |
| Sodium Sulfate | 0.30 |
| Water | 3.00 |
| | 57.64 |

In half the batches weighed the sodium sulfate was omitted. Each weighed batch was melted for two hours and evaluated with respect to seed count as described above.

Example II 605.0 Grams of 73.0% caustic solution was heated to 165° C. in a one gallon Hobart laboratory mixer. 225.0 Grams of feldspar which had previously been sized to pass through a 100 mesh screen, U.S.S., was added and heat was applied to the batch while mixing. After six minutes a temperature of 190° C. had been reached, and the mixture was boiling and thickening. The heat source was removed from the mixer and 416.0 grams of limestone which had previously been sized to pass through a 100 mesh screen, U.S.S., was added to the batch while mixing. The batch thickened further with a pronounced evolution of steam and within three minutes the batch had formed hard, granular aggregates of about $\frac{1}{16}$–$\frac{3}{16}$" diameter. These granules were dried to a constant weight in a 300° C. oven and ground in a Denver-Davis Laboratory Pulverizer to pass through a 100 mesh screen, U.S.S. The material was then evaluated in glass melts.

Weight of raw materials used to form one glass patty were as follows:

| | Grams |
|---|---|
| Sand | 34.02 |
| Reaction Product | 21.75 |
| Sodium Sulfate | 0.30 |
| Water | 3.00 |
| | 59.07 |

In half the batches weighed the sodium sulfate was omitted. Each weighed batch was melted for two hours and evaluated with respect to seed count as described in Example I above.

Thus Example I shows a method of glass making employing the alkali metal oxide and aluminum oxide source material of the present invention. Example II employs a further embodiment of reacting the alkali metal oxide and aluminum oxide source material with an alkaline earth metal oxide source material to form the complex pre-batch hereinbefore disclosed.

*Comparative Example*

(Illustrative of conventional practice)

For comparative purposes, patties were made by the procedure of Example I, but using conventional raw materials. Weights of raw materials used to form one glass patty were as follows:

| | Grams |
|---|---|
| Sand | 34.02 |
| Limestone | 8.32 |
| Soda Ash | 11.73 |
| Feldspar | 4.50 |
| Sodium Sulfate | 0.30 |
| Water | 3.00 |
| | 61.87 |

In half the batches weighed the sodium sulfate was omitted. Each weighed batch was melted for two hours and evaluated as described above. The Table shows the results of these seed count tests.

TABLE.—SEED COUNT DATA

| | Fining agent used | | | No fining agent | | |
|---|---|---|---|---|---|---|
| Glass batch | Seed/cc. | Percent deviation | No. of patties | Seed/cc. | Percent deviation | No. of patties |
| Example I | 43 | 7 | 4 | 7 | 50 | 3 |
| Example II | 33 | 36 | 6 | 13 | 60 | 6 |
| Comparative example | 49 | 10 | 6 | 121 | 12 | 4 |

"Seed Count" is commonly recognized by those skilled in the art as an indicator of the completeness of the glass-making reactions. Use of the reaction product (Example I) or the complex pre-batch (Example II) in the glass making process without the fining agent produced vastly superior glass product in terms of lower seed count.

What is claimed is:

1. A method of making a glass batch to produce a glass product which comprises:
   (a) preparing an aluminum-alkali metal complex as a source of the aluminum oxide and as at least a 50 percent source of the alkali metal oxide in the final glass product by reacting a mixture of an aluminum oxide source for glass making and an aqueous alkali metal hydroxide solution at a temperature at which the alkali metal hydroxide is liquid for a time sufficient to react essentially all of the aluminum oxide source to form an aluminum-alkali metal complex;

(b) drying said complex;

(c) admixing said complex with at least one glass former selected from the group consisting of silica and boric oxide sources and with an alkaline earth metal oxide source, the admixture having essentially no sodium sulfate added thereto, thereby obtaining a glass batch to be introduced into the glass melting furnace.

2. The method of Claim 1 wherein the alkaline earth metal oxide source material is calcium carbonate, the alkali metal hydroxide is sodium hydroxide, and the aluminum oxide source is feldspar.

3. The method of Claim 1 wherein in step (a) the aqueous mixture is reacted at a temperature within the range of from about 130° C. to about 190° C. for up to about 120 minutes.

4. The method of Claim 1 wherein in step (c) the glass former is silica.

5. The method of Claim 1 wherein at least 3 moles of said alkali metal hydroxide are employed per mole of source of aluminum oxide.

6. A method of making a glass batch to produce a final glass product which comprises:
(a) preparing an aluminum-alkali metal complex as a source of the aluminum oxide and as at least a 50 percent source of the alkali metal oxide in the final glass product by reacting a mixture of an aluminum oxide source for glass making and an aqueous alkali metal hydroxide solution at a temperature at which the alkali metal hydroxide is liquid;
(b) preparing an aluminum-alkali metal-alkaline earth metal complex as a source of the aluminum, and alkaline earth metal oxides, and at least a 50 percent source of the alkali metal oxide in the final glass product by reacting the aluminum-alkali metal complex with an alkaline earth metal oxide source at a temperature within the range of from about 60° C. to about 215° C. for a time sufficient to react a substantial amount of the alkaline earth metal oxide source to form an aluminum-alkaline earth metal-alkali metal complex;

(c) drying said complex;

(d) admixing said complex with at least one glass former selected from the group consisting of silica and boric oxide sources, the admixture having essentially no sodium sulfate added thereto thereby obtaining a glass batch to be introduced into a glass melting furnace.

7. In a method of making a glass product by melting a batch containing at least one glass former, an alkaline earth metal oxide source material, a source of aluminum oxide, and a source of alkali metal oxide, wherein essentially no sodium sulfate is added, the improvement of using as a source of the aluminum oxide and the entire source of the alkali metal oxide an aluminum-alkali metal complex prepared by reacting at least one alkali metal hydroxide with a source of aluminum oxide for glass making at a temperature at which the alkali metal hydroxide is liquid.

References Cited
UNITED STATES PATENTS

| | | | |
|---|---|---|---|
| 3,149,983 | 9/1964 | Maris et al. | 106—52 |
| 3,001,881 | 9/1961 | Slayter | 106—52 |
| 3,489,578 | 1/1970 | Pugh | 106—52 |
| 3,234,034 | 2/1966 | Jasinski et al. | 106—54 |
| 3,081,180 | 3/1963 | Krinov | 106—52 |
| 3,573,887 | 4/1971 | Mod et al. | 65—18 |
| 3,630,673 | 12/1971 | Mod et al. | 23—184 |

FOREIGN PATENTS

| | | | |
|---|---|---|---|
| 1,034 | 1852 | Great Britain | 106—52 |

WINSTON A. DOUGLAS, Primary Examiner

M. L. BELL, Assistant Examiner

U.S. Cl. X.R.

65—134; 106—Dig. 008